Nov. 5, 1940.   E. D. FLYNN ET AL   2,220,324
APPARATUS FOR FILTRATION
Filed Nov. 23, 1936   6 Sheets-Sheet 1

INVENTOR
Edward D. Flynn
Frederick E. Kurz
BY
LeRoy Hanslom
ATTORNEY.

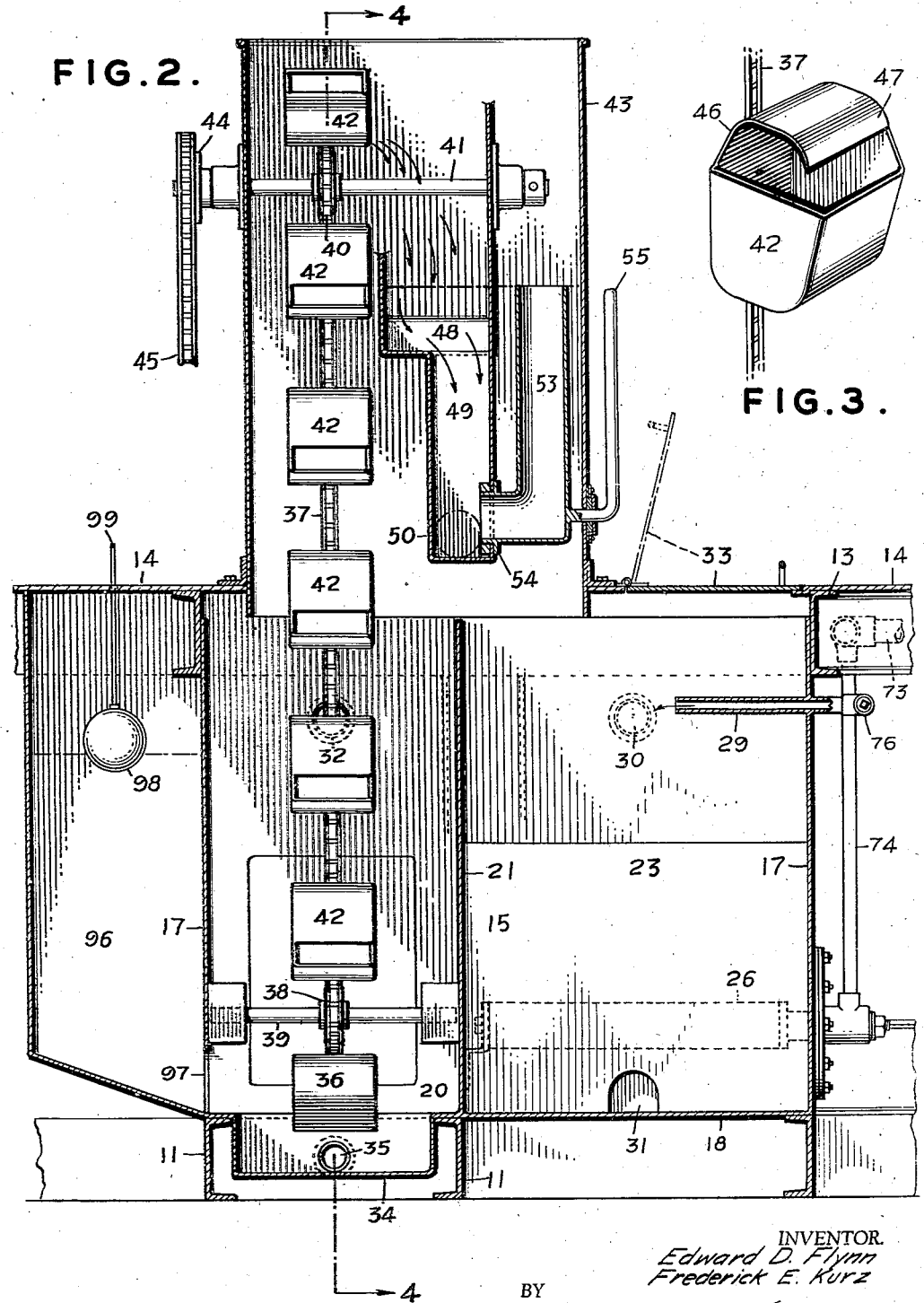

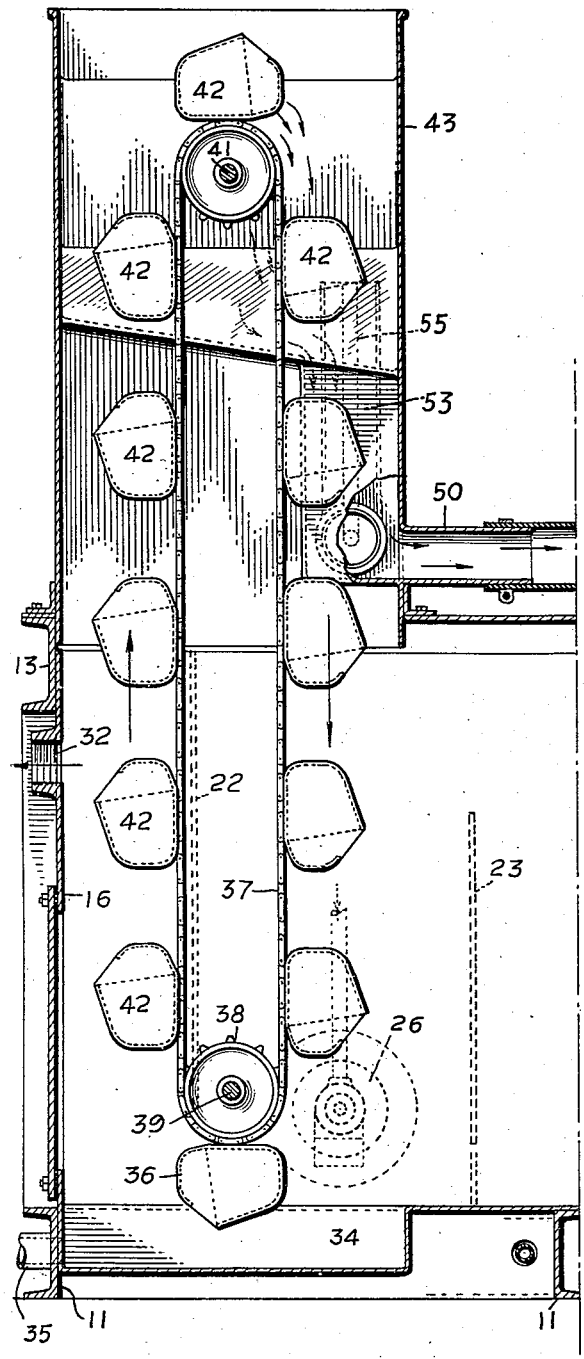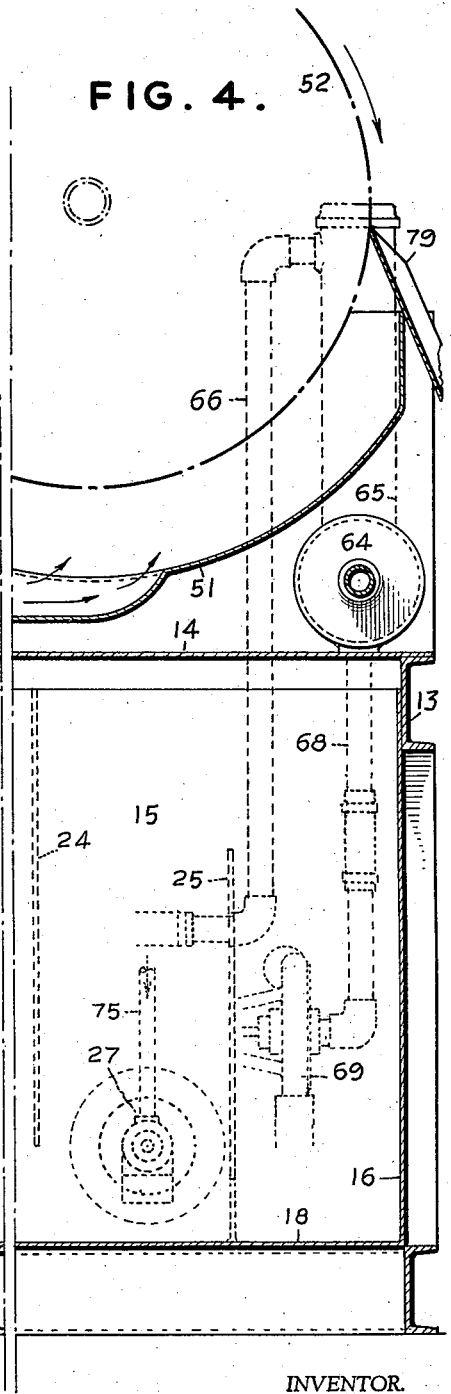

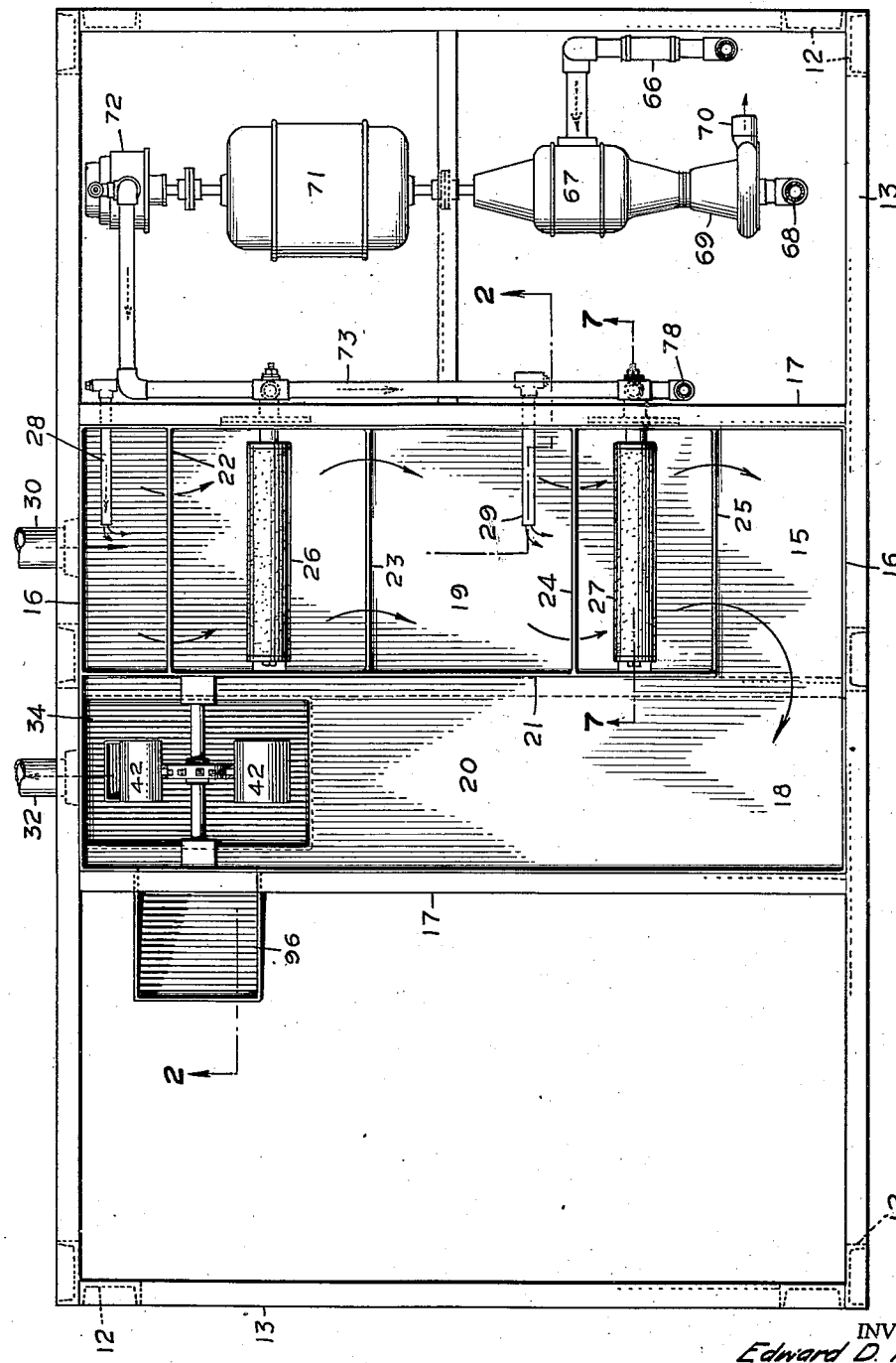

Nov. 5, 1940. E. D. FLYNN ET AL 2,220,324
APPARATUS FOR FILTRATION
Filed Nov. 23, 1936  6 Sheets-Sheet 5

INVENTOR.
Edward D. Flynn
Frederick E. Kurz
BY
ATTORNEY.

Nov. 5, 1940.  E. D. FLYNN ET AL  2,220,324
APPARATUS FOR FILTRATION
Filed Nov. 23, 1936   6 Sheets-Sheet 6
FIG. 8.
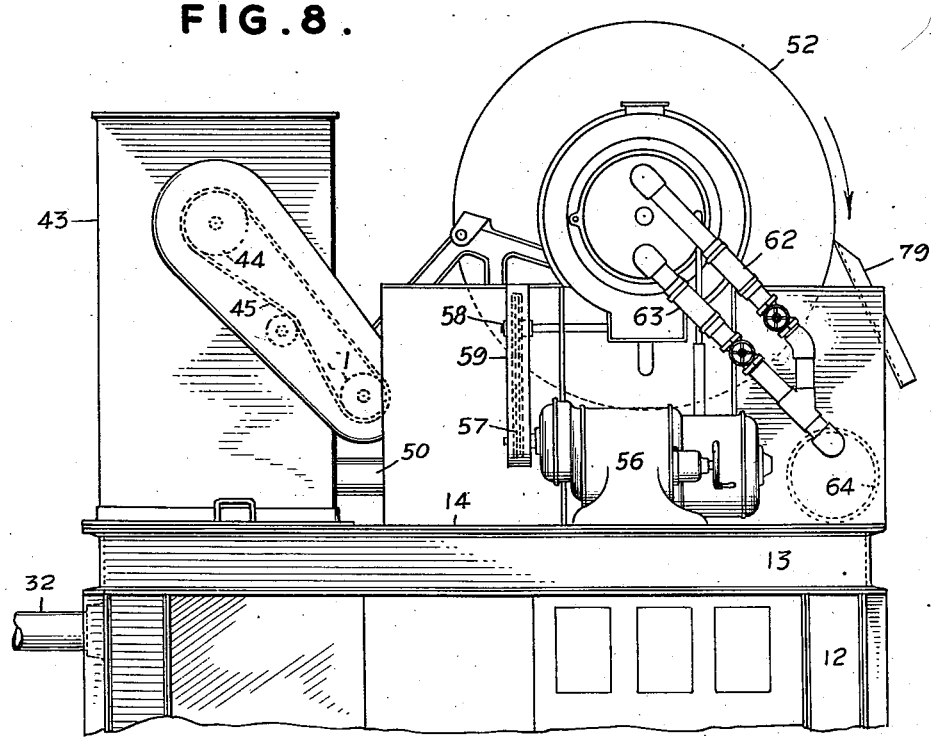
FIG. 9.
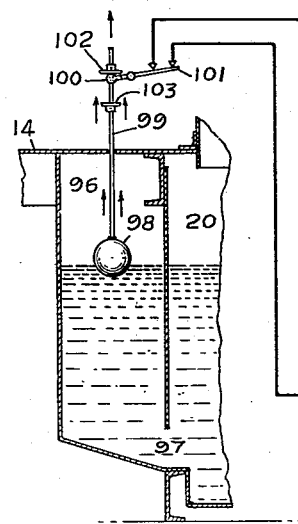
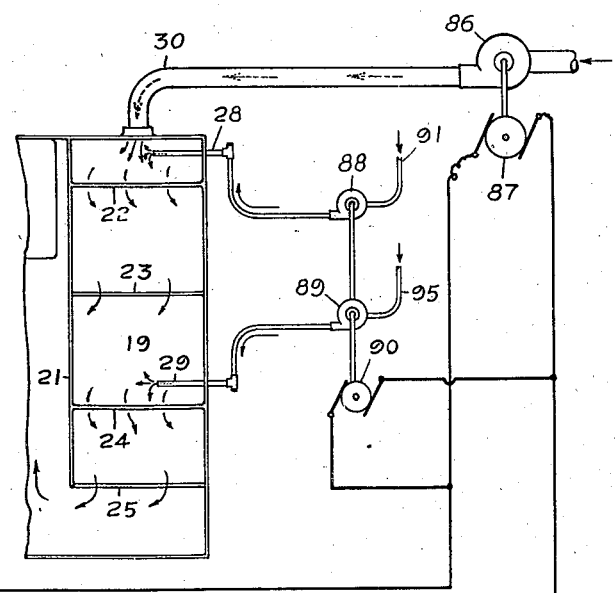
INVENTOR
Edward D. Flynn
Frederick E. Kurz.
ATTORNEY.

Patented Nov. 5, 1940

2,220,324

UNITED STATES PATENT OFFICE 2,220,324

APPARATUS FOR FILTRATION

Edward D. Flynn, Oakland, Calif., and Frederick E. Kurz, Glen Ellyn, Ill., assignors to Oliver United Filters Incorporated, San Francisco, Calif., a corporation of Nevada Application November 23, 1936, Serial No. 112,274
In Great Britain May 27, 1936

4 Claims. (Cl. 210—2)

This invention relates to the filtration or dewatering of sewage sludge or sludge derived from other liquid-solids mixtures.

More specifically, the invention relates to a unitary, portable, self-contained structure or plant wherein sludge is chemically conditioned and fed to a filter, preferably of the rotary vacuum type, which substantially removes the moisture from the sludge producing a filter cake and a filtrate substantially freed of solid constituents. It relates further to the provision of means for automatically feeding sludge to the apparatus and correlated means for proportionately feeding and mixing chemical reagents into the incoming sludge.

One embodiment of the invention includes a supporting framework upon which the various parts are mounted in unitary arrangement. There is provided a transversely-extending mixing chamber divided into two sections by a partition terminating near one end of the chamber. Sludge is pumped into an end of one section and flows therethrough, being subjected in its flow to injections of chemical conditioning reagents and agitation for thorough mixing in of the chemicals. It then flows in an opposite direction in the adjacent section and deposits in a sump from whence the dosed sludge is elevated by an endless bucket elevator and discharged into a superposed hopper. The sludge flows in controlled manner from the hopper to the trough of a rotary vacuum filter, wherein it is dewatered and the filter cake and filtrate disposed of in suitable manner. All of the essential operating elements are carried by the supporting structure in appropriate relationship and the apparatus is designed to be a compact, unitary machine, practically automatic in operation, and of particular value for use in small sewage-treatment plants.

One object of the invention is to provide a compact, unitary apparatus for chemically conditioning and filtering sludge.

Another object is to automatically feed sludge and chemical reagents to the mixing chamber in such manner that the feed of sludge is controlled relative to the capacity of the machine and the feed of chemicals is proportioned relative to the feed of sludge.

A further object of the invention resides in placing sewage sludge in a flocculated, filterable condition by the addition of suitable chemicals and then delivering the flocculated sludge to a filter without any appreciable injury to the flocs.

Still another object is the providing of novel conveying elements or buckets for the endless elevator forming a part of the machine.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction within the scope of the claims may be resorted to without departing from the spirit of the invention or sacrificing any of the advantages thereof.

Referring to the drawings:

Figure 2 is an enlarged vertical section on the lines 2—2 of Figures 1 and 5;

Figure 3 is an enlarged perspective view of one of the conveyor elements or buckets constituting one of the features of the present invention;

Figure 4 is a sectional view on the line 4—4 of Figure 2, showing additional parts of the apparatus and with certain parts broken away;

Figure 5 is a plan view, similar to Figure 1, with the cover plate removed;

Figure 8 is an end elevation of the apparatus, looking in the direction of the arrow 8 in Figure 1; and Figure 9 is a diagrammatic view showing the general arrangement of the means for feeding sludge and chemicals and the means of control therefor.

Figure 1:
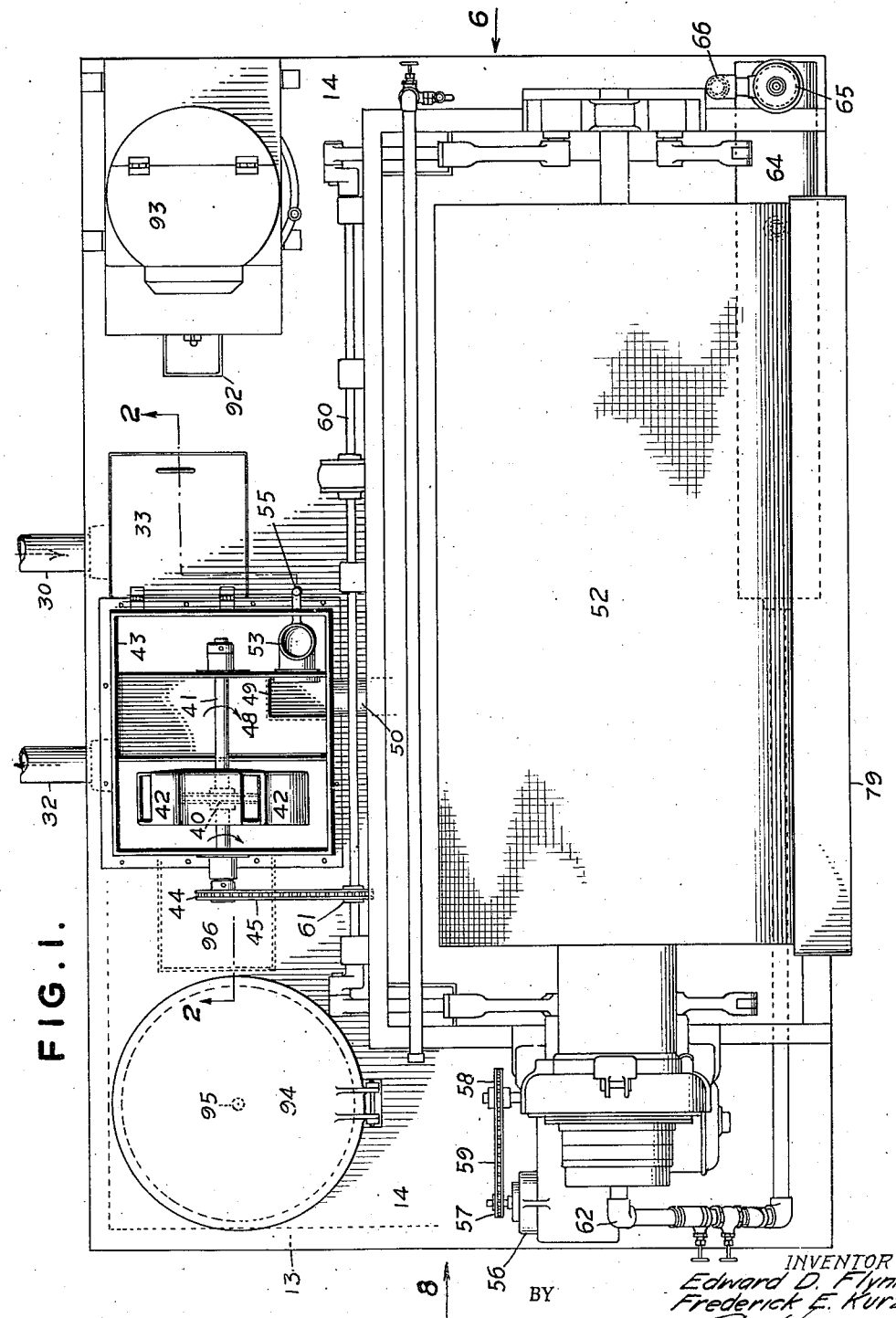
Figure 1 is a top plan view of an apparatus embodying the features of the present invention.
Figure 6:
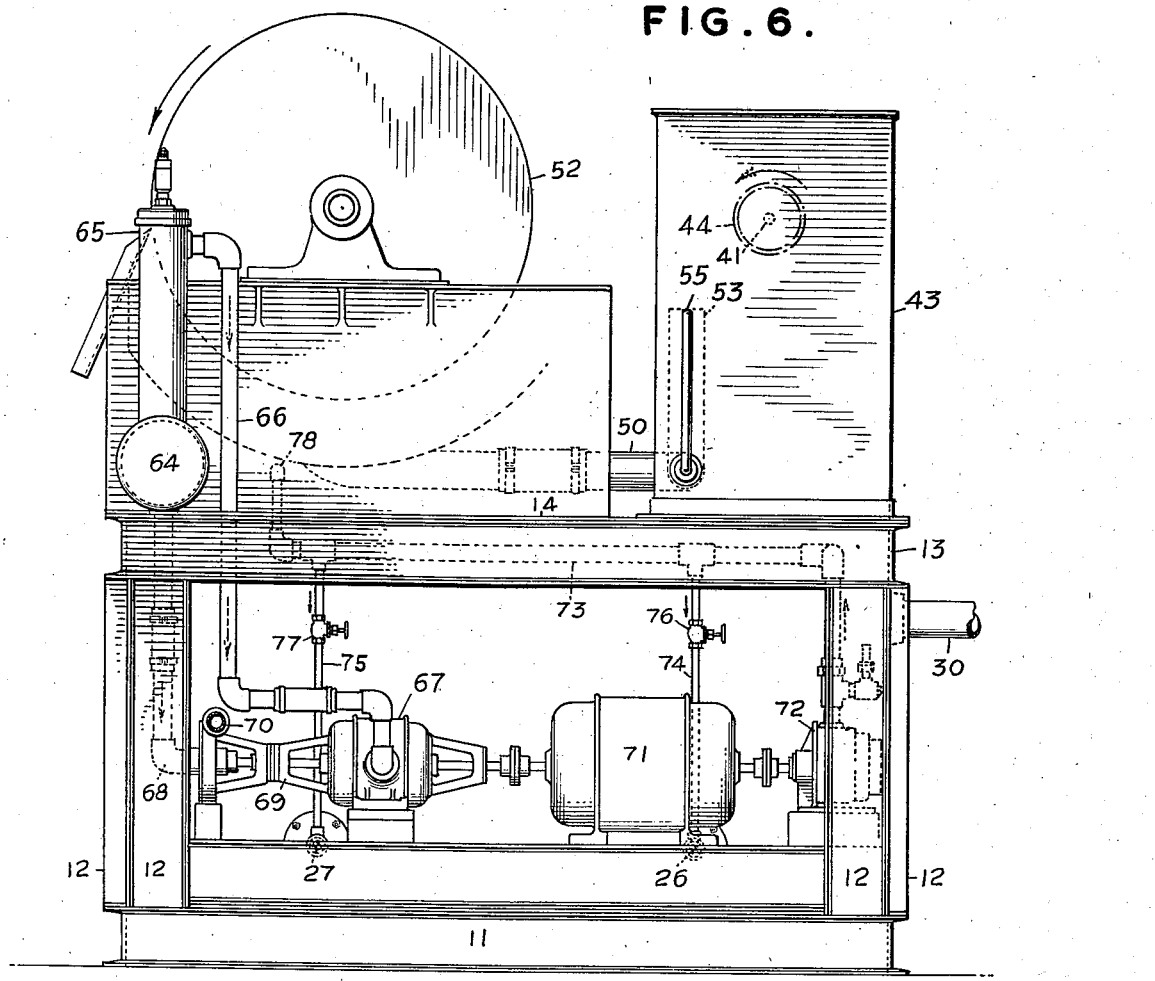
Figure 6 is an end elevation of the apparatus looking in the direction of the arrow 6 in Figure 1.

Referring to the drawings in detail, there is provided a rigid supporting framework formed of the lower beams 11, the vertical beams 12, and the upper beams 13, thus furnishing an enclosing and supporting structure, substantially rectangular in cross-section, for the various elements of the device. Certain of these elements, as will be described hereinafter, are mounted within the confines of the framework on the beams 11, and others are mounted above the level of the upper beams 13 and carried by a cover plate member 14, supported on the beams 13 and substantially closing the top portion of the framework.

Extending transversely of the framework approximately midway between the ends thereof is a sludge mixing or dosing chamber, designated generally as 15, wherein chemical-conditioning reagents are supplied to the incoming sludge and thoroughly mixed therewith. This chamber is defined by the end walls 16, side walls 17 and bottom wall 18 and is divided into two juxtaposed sections 19 and 20 by the partition 21 which terminates short of one end wall 16, so that the sections 19 and 20 are intercommunicating around the end of partition 21. The section 19 is provided with a series of under and over baffles 22, 23, 24 and 25, extending between the partition 21 and side wall 17, and also with similarly extending hollow porous air tubes 26 and 27. Open-ended tubes or nozzles 28 and 29 project into the section 19 through the side wall 17 for the purpose of injecting chemicals into the sludge within the dosing chamber. Sludge is supplied to the dosing chamber through the pipe 30 and, at the same time, a chemical, preferably ferric chloride, is permitted to flow from the tube 28 mingling with the incoming sludge. The mixture passes under the baffle 22 and is subjected to thorough mixing by the violent agitation afforded by the emanation of air under pressure through the walls of porous air tube 26. It then flows over the baffle 23 and may be subjected to injection of another chemical reagent, preferably lime, from the nozzle 29, thereafter passing under the baffle 24 into another zone of agitation, afforded by the porous air tube 27, over baffle 25 and around the end of partition 21 into the section 20, as indicated by the arrows in Figure 5. Thus, when the sludge reaches section 20, it is completely conditioned for filtering, having been subjected to injections of one or more chemical conditioning reagents which have been thoroughly mixed and dispersed in the sludge by the air agitation and the effects of the tortuous passage past the under and over baffles. The baffles 23 and 25 may be provided with by-pass openings 31 (Figure 2) to prevent accumulating of deposited solids in the angle formed by those baffles and the floor of the mixing chamber. The section 20 of the mixing chamber is provided with an overflow outlet 32, which determines the maximum level of the liquid and prevents the sludge from overflowing the top of the chamber. The cover plate 14 has a man-hole or hinged inspection plate 33, which may be opened for examination of the section 19 of the mixing chamber.

The section 20 of the mixing chamber is provided at its end adjacent the inlet end of section 19, with a depression projecting below the floor 18 and forming a sump 34, which may be provided with a normally closed drain outlet 35. This sump is for the accommodation of the lowermost reach of an endless bucket elevator designated generally as 36. This bucket elevator is formed of an endless chain 37, passing around a lower sprocket 38 carried on shaft 39 journaled in suitable bearings, and the upper sprocket 40 carried by shaft 41, also journaled in suitable bearings. Rigidly attached to the chain 37 by rivets or other means are a plurality of bucket-conveying elements 42 of novel form, shape and operation, each constituting an important feature of this invention. A housing 43 extends above the cover plate 14 in communication therethrough with the mixing chamber and constitutes an enclosure and support for the upper reach of the elevator 36, and associated elements hereinafter described. The shaft 41 extends through one of the walls 43, and carries on its outer end a sprocket 44 for the reception of a drive chain 45 for rotating the shaft 41 and operating the endless elevator.

In Figure 3 will be seen an enlarged detailed view of the novel bucket-conveying element 42. This element, as will be seen, comprises a body portion closed at the bottom and all four sides, and having a curved-over top portion 46 with downwardly-depending lip 47. One end of the element 42 is completely closed and joins to the top portion 46, the other end being open between the upper edge of the main body portion and the top portion 46. The bucket is also open between the lower edge of the lip 47 and the upper edge of the main body portion. It will thus be seen that the element 42 dips down into the sludge within the mixing chamber and the sump 34, and is filled through the space between the lip 47 and the main body portion. The chain 37 carries the bucket up and around the upper sprocket 40 until it assumes an upside-down position, whereupon one end of the bucket being completely closed, the sludge will flow out of the open end and be dumped into the hopper 48, as indicated by the arrows in Figure 2.

The hopper 48 extends across the elevator housing 43 and, as above described, receives all of the sludge carried upwardly and dumped by the buckets 42. It is provided with a downwardly-extending portion 49, constituting a discharge section and into which the sludge flows from the hopper 48. The lower end of the discharge section 49 has passing therefrom and in communication therewith, a pipe or conduit 50, which communicates preferably in a tangential manner with the lower portion of the trough 51 of a filtering device, preferably of the rotary vacuum type, and in the present instance shown by way of illustration to be an Oliver rotary vacuum filter. Filters of this type are well known in the art and the same will not be fully described herein, but will be referred to generally. It will be seen that the sludge dumped into the hopper 48 will pass therethrough downwardly from the discharge section 49 and by way of the conduit 50 into the trough 51 of the filter designated generally as 52.

A novel arrangement is shown for controlling the flow of sludge from the hopper 48 to the filter, by adjusting the height of the sludge within the filter trough, and the same means is also effective in draining the filter trough and the hopper 48. This means comprises an elbowed pipe section 53 pivotally mounted at 54, in the lower end of the discharge section 49, and provided with an operating handle or lever 55 extending through the wall of the housing 43, so as to be conveniently operated by hand. The pipe 53 normally is maintained in an upright position, and it will be seen that the sludge level in the hopper 48 and also in the filter trough 51 cannot become higher than the upper end of the pipe 53, which is open so that sludge rising within this pipe will overflow the open end thereof and fall back into the mixing chamber 15. By turning the handle 55, the upper end of pipe 53 may be adjusted to various heights which, as is readily seen, will be effective in maintaining any desired level of sludge within the hopper and the filter trough. By turning the pipe to a horizontal or lower position, the hopper 48, discharge section 49, and filter trough 51 may be emptied and drained whenever such action is desirable or necessary.

The filter assembly 52 is mounted on the cover plate 14, as is also a motor 56 which, through sprockets 57 and 58 and chain 59 and suitable gearing, imparts the necessary rotary movement to the drum of the filter. The longitudinally-extending drive shaft 60 is also connected with the motor 56 by suitable power-transmission mechanism and, through sprocket 61, chain 45 and sprocket 44, transmits the power for operation of the endless bucket elevator hereinbefore described. Certain conventional parts of the filter assembly are shown: the valved pipes 62 and 63 for maintaining a vacuum within the drum by withdrawing air, the same leading to the vacuum receiver 64. Air and filtrate liquid are conveyed to the vacuum receiver by the pipes 62 and 63 and the receiver is provided at one end with a stand-pipe section 65. Air is exhausted from the stand pipe through the pipe 66 by means of the vacuum pump 67, and liquid, which collects in the receiver 64, is withdrawn therefrom through pipe 68 by means of centrifugal pump 69 and discharged through pipe 70. A motor 71 drives pumps 67 and 69 and also an air compressor or blower 72 which supplies air under pressure through pipe 73 and valved branch pipes 74 and 75 to the air-agitation tubes 26 and 27 hereinabove described. Air may be supplied to tubes 26 and 27 jointly, singly, or not at all by manipulation of valves 76 and 77, and air may be conducted to the filter assembly for blow-back purposes by pipe 78. The filter is provided with scraper 79 for stripping off the filter cake.

Figure 7:
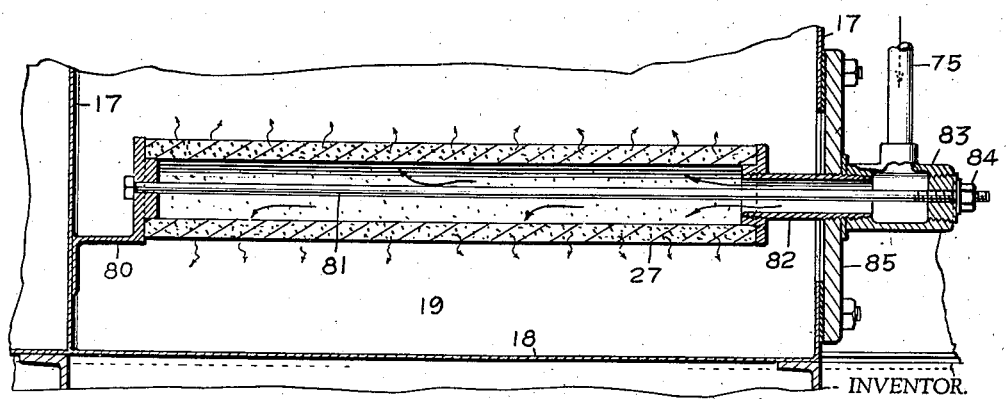
Figure 7 is an enlarged sectional view through one of the air-agitation tubes, taken on the line 7—7 of Figure 5.

A detailed view of one of the air-agitation tubes is shown in Figure 7. The tube is mounted at one end on a bracket by means of the tie-rod 81 which extends through the length of the hollow tube 27. A section of piping 82 supports the other end of the tube and extends through an opening in the wall 17 of the mixing chamber and communicates with the air-supply pipe 75 through the pipe joint 83. Tie-rod 81 extends through pipe section 82 and pipe joint 83 and a nut 84 at the end thereof clamps the pipe joint against plate or washer 85, thus holding the air tube 27 and associated elements firmly in position, but allowing ready removal for repair or replacement. The construction and arrangement of both air tubes is identical and the tubes 26 and 27 may be provided with perforations to emit air, but are preferably formed of a porous material that will allow the free passage of air therethrough. Air under pressure enters tube 27 from pipe 75 and is forcibly ejected through the surface of the tube in all directions, thereby setting up a zone of intensive agitation for effecting efficient mixing of the sludge and chemicals as hereinbefore described. While the air tubes shown and described herein are the preferred means for effecting the agitation necessary for thorough mixing, it is to be understood that the invention is not necessarily limited thereto and that other types of agitating means within the scope of the claims may be used when desirable.

One of the important features of the present invention is in the method of and arrangement for effecting and controlling the influx of sludge to the machine and the injection of chemicals thereinto, a diagrammatic illustration of which appears in Figure 9. In this view will be seen the section 19 of the mixing chamber, and under and over baffles 22, 23, 24 and 25, the sludge-inlet pipe 30 and the chemical injectors 28 and 29. Numeral 86 indicates a pump of relatively high capacity and 87 is a motor for driving the same. This pump is larger than that necessary to deliver a continuous supply of sludge to the machine as will be hereinafter described and for reasons which will appear.

Pumps 88 and 89, operated by motor 90, force chemical reagents, from suitable mixing and storage tanks, through and out of injectors 28 and 29, respectively. Tubing 91 connects pump 88 with the hopper 92 (Figure 1) of a lime-mixing and storage tank 93 mounted on cover plate 14. Lime is mixed with water in tank 93 to form milk of lime and flows therefrom to the hopper 92 and is pumped to the injector 28. There is also mounted on cover plate 14 a storage and supply tank 94 for ferric chloride or other chemical which it is desired to use. Tubing 95 connects this tank with pump 89, which draws the chemical therefrom and forces it through injector 29.

It is proposed, in the present instance, to operate the pumps 86, 88 and 89 in unison, but intermittently. In other words, as long as the supply of sludge in the mixing chamber is below a predetermined level, the pump 86 will operate to deliver a feed of fresh sludge through supply pipe 30. At the same time, and as long as pump 86 is in operation, the pumps 88 and 89 will function to deliver a continuous supply of chemical conditioning reagents to the mixing chamber. The sludge flows past the under and over baffles and just beyond each zone of chemical injection is subjected to thorough mixing by the agitation effected by the air tubes 26 and 27. The pump 86 is of a size and capacity that it delivers sludge in a volume in excess of that conveyed to the filter by the elevator 36. The level of the liquid in the mixing chamber, therefore, will continue to rise as long as the pump is in operation. As soon, however, as the sludge level reaches a predetermined height, automatic means are effective to break the electric circuit common to the pumps 86, 88 and 89, which renders the pumps inoperative and stops the flow of sludge and chemicals to the mixing chamber. The advantages of using a pump 86 of relatively high capacity in intermittent operation instead of a smaller one in continuous operation are at least two-fold. The larger pump will probably use less power, as it can be operated at a relatively low speed and will be subject to less wear. Furthermore, a more accurate proportioning of chemicals to sludge can be obtained by this mode of operation. It is well known that a substantial amount of slippage occurs in a pump working continuously at relatively high speed. In that case it is obvious that the desired proportion of chemicals to sludge would be difficult to maintain constant, since the volume of sludge supplied continuously would vary from time to time. Very little or no slippage will occur in the large capacity, slow operation pump 86, and, once the injection of chemicals is adjusted in accordance with the influx of sludge, the ratio will remain constant with each batch of sludge and chemicals caused to flow into the machine. Furthermore, whereas a small pump which would deliver approximately the amount of sludge handled by the filter would become clogged with large particles of foreign matter entrained in the sludge, a large pump will pass such particles and may be used intermittently.

The operation of motors 87 and 90 is controlled by a float-operated switch, as shown in Figure 9. The section 20 of the mixing chamber has associated therewith and in communication therewith a float chamber 96 which is located adjacent the elevator sump 34. That section of the wall 17 of the mixing chamber along which the float chamber extends is cut away at the bottom to afford a passage 97 whereby the sludge may pass into the float chamber and assume a common level therein with that of the sludge in the mixing chamber. A hollow ball 98 or other suitable buoyant element is suspended in the float chamber 96 at the end of a rod or shaft 99 and floats on the surface of the sludge when the same is at a sufficient height in the chamber. The rod 99 extends through an opening in the cover plate 14 and is in slidable engagement with a sleeve 100 at the end of a pivoted snap-switch lever 101. Adjustable collars 102 and 103 on the rod 99 limit the extent of its sliding movement through the sleeve 100.

The positive and negative sides of the circuit for supplying electric current for operation of the motors 87 and 90 are indicated by the lines 104 and 105, respectively. As long as the sludge level is at the height shown in Figure 9 or at a lower height, it will be apparent that the switch 101 will maintain the electric circuit closed and the pumps 86, 88 and 89 will continue to deliver sludge and chemicals into the mixing chamber. As the sludge level rises, the float 98 will rise also, causing the rod 99 to slide upwardly through the sleeve 100 until the collar 103 comes in contact with the sleeve, whereupon any further upward movement will cause the switch 101 to be snapped open, thereby breaking the electric circuit and discontinuing the feed of sludge and chemicals. The circuit will then remain open until the sludge level drops to a height where the collar 102 will contact the sleeve 100 and snap the switch 101 into a closed position, thereby causing the sludge and chemical pumps to function again. Either one or both of the chemical injections may be dispensed with, of course, should such procedure be desirable, by disconnecting the motor and either or both pumps, or by shutting off the supply of chemical in other appropriate manner.

By resorting to the use of a bucket elevator instead of a sludge pump or gravity feed for conveying the chemically conditioned sludge to the filter tank, the flocs formed by the chemical treatment are preserved without any appreciable injury. This factor is of prime importance, for the filterability of sewage sludge depends largely upon the existence of these flocs.

The sludge-conditioning and filtering apparatus of the present invention is designed with a particular object of supplying an important item for use in relatively small sewage-treatment plants. In accordance with present-day trends of thought, it is becoming increasingly important that even very small communities treat their sewage and waste waters, at least to the extent of removing suspended or putrescible solid matter therefrom. In fact, in many instances, legislative action makes it mandatory that communities subject their sewage to specified treatment before it is discharged into streams. In the case of relatively large towns and cities practically all of the treatment apparatus generally is designed and built to order according to the conditions and requirements existing in each individual locality. Construction of plants according to that practice is generally an expensive undertaking, requiring the services of engineers, contractors, etc., and such expense frequently is not warranted in the erection of relatively small plants.

In view of these facts, it is an important concern of those supplying sanitary engineering equipment to provide machines, apparatus and units for use in sewage-treatment plants which may be sold "off the shelf," so to speak, and which require practically no erection or installation expense and may be installed in a plant and operated by persons possessing little or no engineering experience.

The apparatus of the present invention is constructed, sold and operated as a unit for conditioning and filtering the sludge derived from the daily sewage of a certain amount of population, say for example, a maximum of five thousand persons. Therefore, a town of five-thousand population could purchase and easily install and operate one machine. A town of fifteen thousand would require three; and one of seventeen thousand, four machines, assuming, of course, that the units are of the capacity indicated above. Obviously, the machines may be constructed for any suitable or desired capacity.

Having now particularly described and ascertained the nature of our said invention, and in what manner the same is to be performed, we declare that what we claim is:

1. Sludge-conditioning and filtering apparatus comprising: a mixing chamber; means for supplying sludge to said chamber; means for flocculating said sludge; a filter disposed above the level of said chamber; and a bucket elevator for conveying the flocculated sludge from said chamber to said filter.

2. Sludge-conditioning and filtering apparatus comprising: a mixing chamber; means for supplying sludge to said chamber; means for supplying chemical conditioning reagents to said chamber; agitating means within said chamber; a filter disposed above the level of said chamber; and a bucket elevator for conveying chemically conditioned sludge from said chamber to said filter.

3. Sludge-conditioning and filtering apparatus comprising: a mixing chamber; means for supplying sludge to said chamber; a filter disposed above the level of said chamber; a housing extending upwardly from said mixing chamber with its upper end adjacent said filter; a hopper within said housing, having a downwardly-extending discharge section; a bucket elevator disposed within said housing for conveying sludge from said chamber to said hopper; a conduit leading from said discharge section to said filter; and an open-ended pipe section pivoted in said discharge section for regulating the sludge level in said hopper.

4. Sludge-conditioning and filtering apparatus comprising: a mixing chamber; means for feeding sludge to said chamber; means for feeding chemical conditioning reagents to said chamber; agitating means within said chamber; a filter; and a bucket elevator for conveying chemically conditioned sludge from said chamber to said filter.

EDWARD D. FLYNN.
FREDERICK E. KURZ.